United States Patent [19]
Crofts

[11] 3,896,739
[45] July 29, 1975

[54] FRANGIBLE RESILIENT ENGINE MOUNTING

[75] Inventor: John G. Crofts, Columbus, Ind.

[73] Assignee: Cummins Engine Company, Inc., Columbus, Ind.

[22] Filed: Dec. 10, 1973

[21] Appl. No.: 423,052

[52] U.S. Cl. .................... 105/133; 105/101
[51] Int. Cl. ...... B61c 3/00; B61c 7/00; B61c 17/00
[58] Field of Search ........ 105/118, 133, 208.1, 101

[56] References Cited
UNITED STATES PATENTS

| | | | |
|---|---|---|---|
| 1,723,720 | 8/1929 | Buchli | 105/133 X |
| 1,748,309 | 2/1930 | Rose | 105/118 X |
| 1,779,751 | 10/1930 | Peters | 105/133 |
| 2,135,394 | 11/1938 | Geissen | 105/133 X |
| 3,547,045 | 12/1970 | Cunningham | 105/208.1 X |

Primary Examiner—M. Henson Wood, Jr.
Assistant Examiner—Howard Beltran
Attorney, Agent, or Firm—Hibben, Noyes & Bicknell

[57] ABSTRACT

Frangible resilient shock absorbing supports are utilized for mounting an engine on the underside of the frame of a vehicle. Three vertical supports are provided to carry the weight of the engine, each vertical support including a resilient member which absorbs vibrations, and further including collapsable self sacrificing members which absorb a severe impact. A horizontal support stabilizes the engine in the fore and aft direction.

9 Claims, 6 Drawing Figures

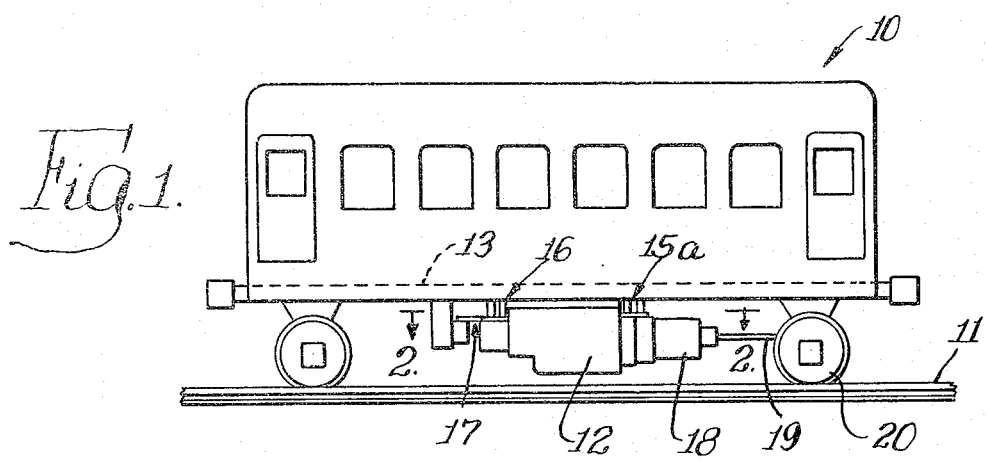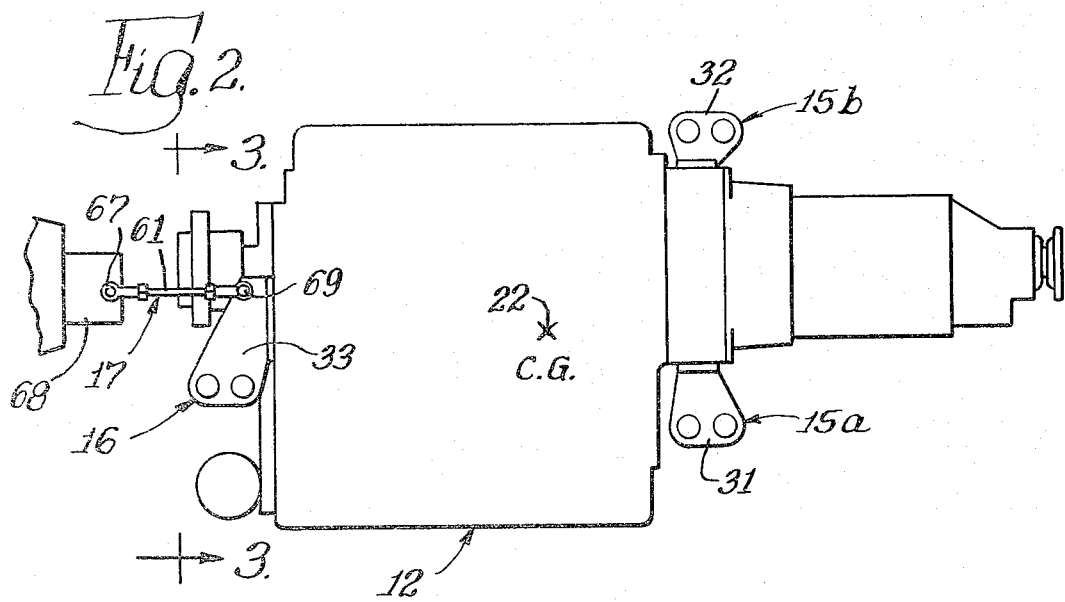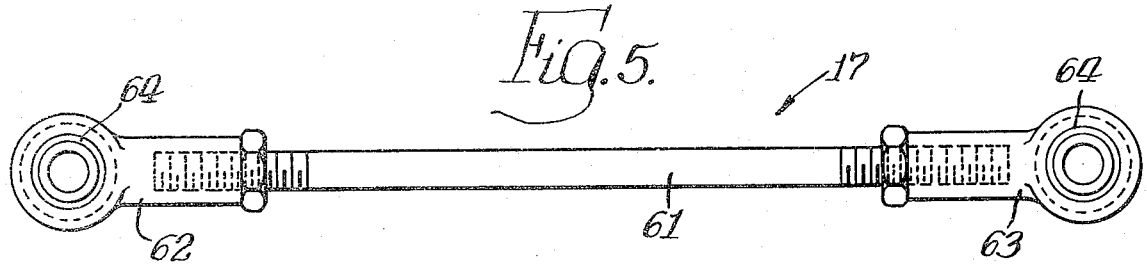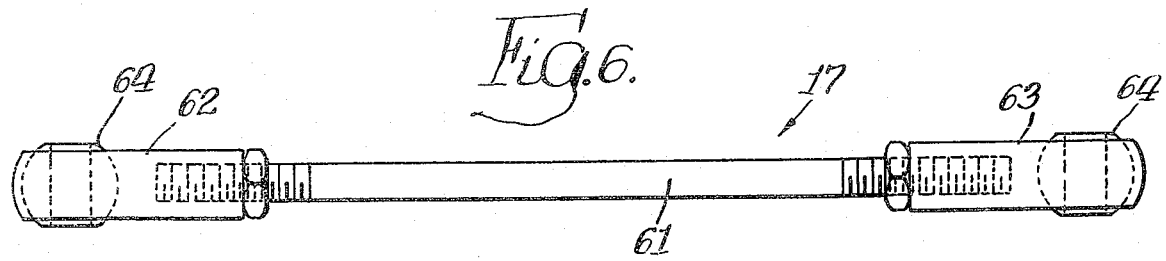

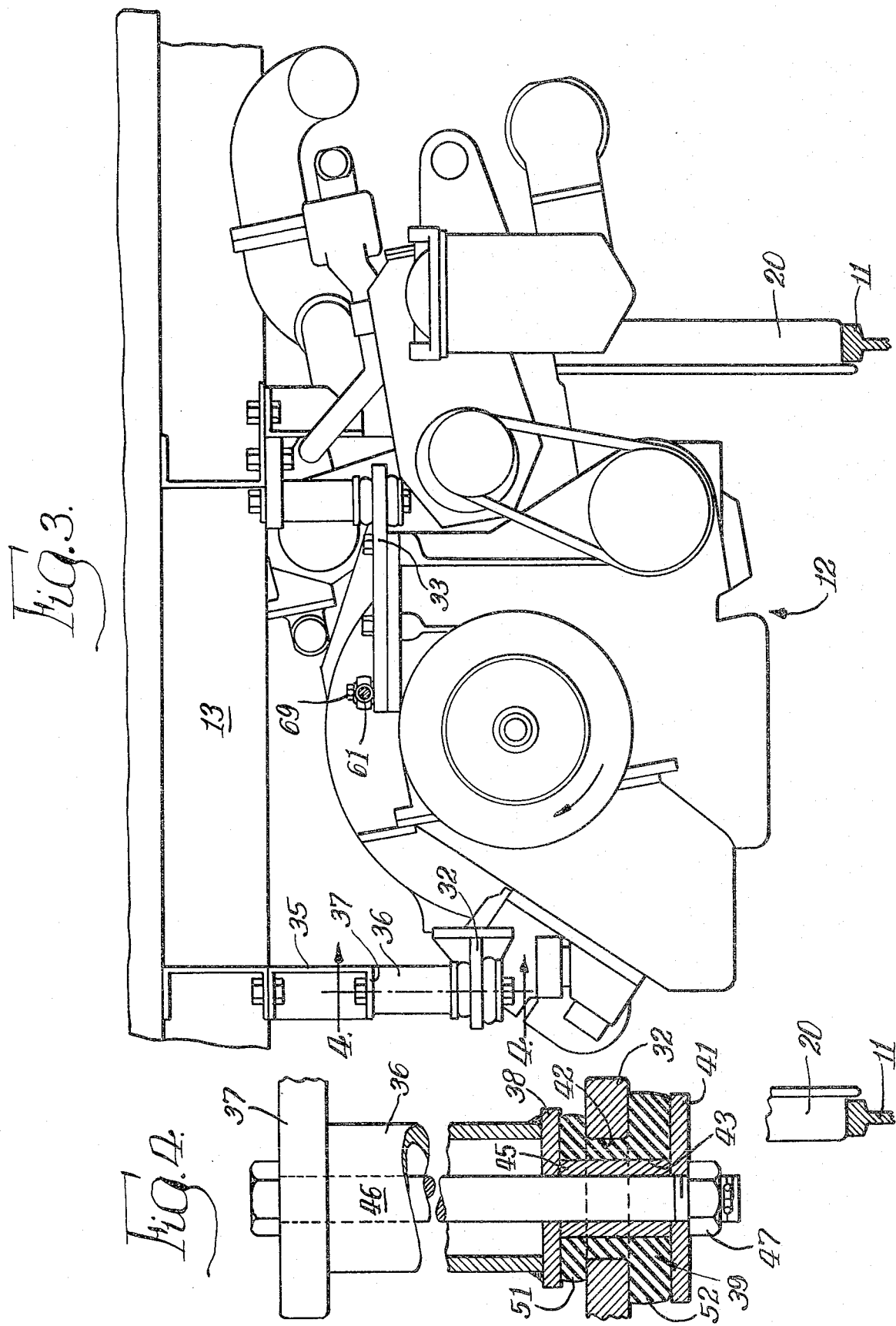

FRANGIBLE RESILIENT ENGINE MOUNTING

In a typical diesel engine installation in a vehicle, the engine is mounted with its center of gravity above the supporting framework of the vehicle, and resilient mountings are provided to attenuate shock and vibration. In some instances however, an engine has been suspended under a vehicle's supporting framework, but problems have been encountered with such an installation because, in a moving vehicle, the engine tends to sway in pendulum fashion in the fore and aft direction. Resilient mountings are desirable to reduce vibrations but tend to aggravate the sway. On the other hand, a rigid mounting has been found to be unsatisfactory because the tendency of the engine to sway results in continuous flexing of the framework and, ultimately, failure due to fatigue. A successful underframe mounting must therefore be able to overcome the foregoing difficulties.

In addition, where the engine is in a vehicle such as a train, the mounting should isolate the frame from engine vibrations, isolate the engine from frame distortions, allow for easy engine installation and replacement, accommodate shocks such as occur during railroad humping operations, and protect, as much as possible, both the engine and the frame in the event of a collision.

It is therefore a general object of the present invention to provide an improved engine mounting apparatus which solves the foregoing problems.

Mounting apparatus in accordance with the present invention is designed to support an engine below a mounting framework of a vehicle. The apparatus comprises at least three vertical supports, each vertical support being fastened to the engine and being adapted to be secured to the vehicle framework, and a horizontal support which is fastened to the engine and is adapted to be fastened to the framework. The vertical supports are spaced around the center of gravity of the engine to substantially equally distribute the load. Each vertical support includes a resilient member which serves as vibration insulation, and a self-sacrificing member which will collapse under unusually high shocks and absorb impacts, thereby protecting both the engine and the framework. The horizontal support is substantially rigid in the horizontal fore and aft direction to prevent fore and aft swaying of the engine, but it is pivotally connected to the engine and the framework so as not to interfere with the operation of the resilient members.

The foregoing and other objects and advantages of the present invention will be apparent from the following detailed description taken in conjunction with the accompanying figures of the drawings, wherein:

FIG. 1 is an elevational view of a vehicle including engine mounting apparatus embodying the invention;

FIG. 2 is a view taken on the line 2—2 of FIG. 1;

FIG. 3 is an enlarged fragmentary view taken on the line 3—3 of FIG. 2;

FIG. 4 is a further enlarged fragmentary view taken on the line 4—4 of FIG. 3;

FIG. 5 is an enlarged view of a horizontal support of the engine mounting apparatus; and FIG. 6 is another view of the horizontal support shown in FIG. 5.

In FIG. 1 is illustrated a vehicle 10 which in the present example is a railway passenger car that rides on rails 11. The car 10 is powered by at least one engine 12 which in the present illustration is a diesel engine. The engine 12 is supported from the underside of the framework 13 of the vehicle 10, the engine 12 being supported by engine mounting apparatus including two rear vertical supports 15a and 15b, front vertical support 16, and a horizontal support 17 (FIGS. 1 and 2). The engine 12 is connected by a transmission 18 and a drive shaft 19 to drive the wheels 20 of the car 10. With reference to FIG. 2, the engine 12 is shown in outline form only, and its center of gravity is located at approximately the point indicated by the reference numeral 22.

The engine 12 includes three mounting plates 31, 32 and 33 which are formed as part of or are rigidly secured to the engine 12, and are respectively associated with the vertical supports 15a, 15b and 16. With reference to FIG. 3, the plates 31, 32 and 33 are horizontally extending heavy rigid members, the plate 31 not being shown but being similar to the other two plates. Each of the vertical supports comprises a pair of mount assemblies, one of the assemblies being shown in detail in FIG. 4. The mount assembly comprises a vertically extending tube spacer 36 which is fastened to the underside of a horizontally extending flange 37 of a channel-shaped beam 35 (FIG. 3) forming part of the framework 13 of the vehicle. The tube spacer 36 is positioned between the flange 37 and a snubbing washer 38 which in the present instance is welded to the lower end of the tube spacer 36. A resilient or elastic mount 39 is positioned and compressed between the snubbing washer 38 and a support plate 41. While the mount 39 may be any resilient material, such as an elastomer or a metal spring, having the appropriate spring rate, in the present instance an elastomer is used. The flange 37, the washer 38 and the plate 41 have aligned holes in them, and a bolt 46 is positioned through the holes. The mounting plate 32 also has a hole 42 formed therein, and the resilient member 39 extends through the hole 42. A tubular inner member 45 extends through a hole 43 formed in the resilient member 39 and is located between the washer 38 and the plate 41. The bolt 46 extends through the inner member 45, and a nut 47 is threaded on to the lower end of the bolt 46. It will be apparent that when the nut 47 is tightened on the bolt 46, the resilient member 39 will be compressed until the support plate 41 tightly engages the lower end of the member 45 which limits the tightning of the nut 47 and the amount of compression on the resilient member 39. The dimensions of the inner member 45 and the resilient member 39 are such that the appropriate amount of compressive force is placed on the resilient member 39 when the inner member 45 is engaged by the snubbing washer 38 and the support plate 41. It will be noted that the upper and lower portions 51 and 52 of the resilient member 39 extend radially above and below the support plate 32, and the resilient member 39 is pressed tightly against the mounting plate 32, thus holding the mounting plate 32 in position between the washer 38 and the plate 41. However, the resilient or elastic characteristic of the member 39 isolates the mounting plate 32 from the remainder of the assembly, so far as shock or vibrations are concerned.

As previously mentioned and as shown in FIG. 2, two mount assemblies as shown in FIG. 4 are provided for each of the vertical supports 15a, 15b and 16. Further, the two mount assemblies of each pair are spaced in the fore and aft direction which is the direction from which a severe shock or impact is likely to be directed. If such a severe shock or impact occurs, the engine 12 will tend to move relative to the framework 13 in the fore or aft direction. Before any substantial amount of such movement of the engine 12 can occur, it is necessary for the tube spacers 36 to buckle, and such buckling of the tube members 36, along with bending and elongation of the bolts 46, absorbs the shock of the impact and thus protects both the framework 13 and the engine 12 from severe damage.

If only the vertical supports 15a, 15b and 16 were provided to support the engine 12, the engine would tend to sway in a pendulum fashion in the fore and aft direction during movement of the vehicle. The horizontal support 17 is provided to prevent such swaying while nevertheless permitting the mount assemblies to isolate the engine 12 from the framework 13. The horizontal, or stabilizer, support 17 shown in detail in FIGS. 5 and 6 comprises a rod 61 which is threaded at each end. Socket members 62 and 63 are threaded on each end of the rod 61, and a ball part 64 is pivotally mounted in each socket member. The horizontal support 17 is fastened to the frame 13 of the vehicle by a pin 67 (FIG. 2) which extends through the ball 64 of the socket member 62, the pin 67 being secured to a member 68 which forms part of the frame 13. At the other end, the ball 64 of the socket 63 has a stud or bolt 69 (FIGS. 2 and 3) therethrough, which is threaded into the mounting plate 33 at the forward end of the engine. Since both of the ball parts 64 are pivotal relative to the associated socket parts 62 and 63, the engine 12 may swing slightly in a lateral direction relative to the axis of the rod 61. However, the fore and aft spacing of the two pins 67 and 69, and the rigid nature of the rod 61 and the socket members 62 and 63 prevents any substantial fore and aft movement of the engine 12.

It will be noted from FIG. 2 that the center of gravity 22 of the engine 12 is laterally offset slightly from the axis of the rod 61. In the event of an unusually high impact on the car 10 or on the engine 12, the engine will tend to move in the fore and aft direction as the tubes 36 collapse and the bolts 46 bend, and the horizontal support 17 will cause the engine 12 to skew slightly. The fore and aft positioning of the mount assemblies of each pair forms a parallel arm arrangement which enhances the support provided by the vertical supports in the fore and aft direction.

From the foregoing it will be apparent that the mounting apparatus in accordance with the present invention provides numerous advantages. The engine 12 and the transmission assembly 18 are supported by three vertical supports which are approximately equally loaded due to their positions around the center of gravity 22 of the engine. While the vertical supports provide excellent support for the engine and the transmission, the resilient members 52 of the supports isolate the engine from the frame and thus prevent engine vibrations from reaching the frame, and at the same time the engine is isolated from frame distortions. Further, the vertical supports and the horizontal support are highly advantageous in that they are made of readily available, inexpensive components which may be easily removed and replaced to allow for engine changes with low cost of manufacture. Further, the horizontal support 17, having pivotal connections at its ends, provides the necessary stiffness or rigidity in the fore and aft direction without interfering with the operation of the vertical supports in isolating the engine from the frame. The horizontal support 17 is thus able to protect the engine from shocks occurring, in the case of a railway car, during railroad humping operations, and the horizontal support 17 provides the support necessary to prevent the engine 12 from swaying in pendulum fashion. In the event an unusually severe shock occurs as by the railway car 10 meeting an obstacle or by something on the tracks being struck by the underside of the engine, the tubes 36 collapse or buckle while the bolts 46 bend and elongate, and these members thus absorb the shock of the impact. Consequently, the engine 12 is protected against severe damage and also the framework 13 of the railroad car is protected against distortion due to an impact on the engine.

I claim:

1. Mounting apparatus for supporting an engine from and below a frame of a vehicle, comprising a plurality of vertical supports, each vertical support being fastened to the engine and being adapted to be suspended from the vehicle frame, each of said vertical supports including rigid means preventing any substantial amount of movement of said engine at shock loads less than a severe impact but collapsing at shock loads above such a severe impact, and a horizontal support fastened to the engine and adapted to be fastened to the frame, said vertical supports being spaced around the center of gravity of the engine to substantially equally distribute the weight of the engine, and said horizontal support being sufficiently rigid in the horizontal fore and aft direction to prevent fore and aft swaying of the engine.

2. Apparatus as in claim 1, wherein each of said vertical supports comprises a pair of mounts, each of said mounts including said rigid means, the mounts of each pair being spaced in the fore and aft direction.

3. Apparatus as in claim 2, wherein each of said pair of mounts further includes a resilient member which provides isolation of vibration between said engine and said frame.

4. Apparatus as in claim 1, wherein said rigid means each include a tubular member extending between said frame and said engine, and a bolt extending through said tubular member and fastening said engine to said frame, said tubular member buckling and said bolt bending under a severe impact.

5. Apparatus as in claim 1, wherein said horizontal support is pivotally connected both to said engine and to said frame and extends in the fore and aft direction of said vehicle and is substantially rigid in the fore and aft direction, said horizontal support being laterally offset from the center of gravity of said engine.

6. Mounting apparatus for supporting an engine from and below a frame of a vehicle, comprising at least three vertical supports, each vertical support being fastened to the engine and being adapted to be secured to the vehicle frame, said vertical support being spaced around the center of gravity of the engine to substantially equally distribute the load, and each vertical support including a self sacrificing member which prevents any substantial movement of said engine at normal loads but which will collapse under unusually high shocks and absorb impacts, thereby protecting both the engine and the frame.

7. Apparatus as in claim 6, wherein each of said vertical supports further includes a resilient member for isolating said engine from said frame.

8. Apparatus as in claim 6, wherein each of said vertical supports includes two mounts which are spaced in the fore and aft direction of said vehicle.

9. Mounting apparatus for supporting an engine from and below a mounting frame of a vehicle, comprising vertical support means fastened to the engine and being adapted to be secured to the vehicle frame, said vertical support means carrying the weight of said engine, and horizontal support means connected to said engine and being adapted to be connected to said frame forwardly of said engine, said horizontal support means being rigid in the horizontal fore and aft direction to prevent fore and aft swaying of the engine, but being pivotally connected to the engine and to the frame, and said horizontal support means being laterally displaced from the center of gravity of said engine.

\* \* \* \* \*